(12) United States Patent
Kim et al.

(10) Patent No.: US 8,496,737 B2
(45) Date of Patent: Jul. 30, 2013

(54) MOVABLE AIR PURIFICATION ROBOT SYSTEM

(75) Inventors: Un Ki Kim, Seoul (KR); Hee Nam Chang, Goyang-si (KR); Man Hee Lee, Seoul (KR); Hong Seuk Park, Seoul (KR)

(73) Assignee: Moneual Inc., Seoul (KR)

( * ) Notice: Subject to any disclaimer, the term of this patent is extended or adjusted under 35 U.S.C. 154(b) by 444 days.

(21) Appl. No.: 12/775,179

(22) Filed: May 6, 2010

(65) Prior Publication Data

US 2011/0271839 A1      Nov. 10, 2011

(51) Int. Cl.
*B01D 53/30* (2006.01)

(52) U.S. Cl.
USPC ............. 96/111; 55/318; 55/356; 55/385.1; 55/400

(58) Field of Classification Search
USPC ............. 55/318, 356, 385.1, 400; 96/111
See application file for complete search history.

(56) References Cited

U.S. PATENT DOCUMENTS

| | | | | |
|---|---|---|---|---|
| 4,726,824 | A * | 2/1988 | Staten | 96/417 |
| 4,900,344 | A * | 2/1990 | Lansing | 55/322 |
| 5,428,964 | A * | 7/1995 | Lobdell | 62/176.6 |
| 6,459,955 | B1 * | 10/2002 | Bartsch et al. | 700/245 |
| 6,594,844 | B2 * | 7/2003 | Jones | 15/49.1 |
| 6,883,201 | B2 * | 4/2005 | Jones et al. | 15/319 |
| 7,024,278 | B2 * | 4/2006 | Chiappetta et al. | 700/245 |
| 7,108,731 | B2 * | 9/2006 | Park et al. | 55/356 |
| 7,188,000 | B2 * | 3/2007 | Chiappetta et al. | 700/245 |
| 7,288,912 | B2 * | 10/2007 | Landry et al. | 318/580 |
| 7,789,951 | B2 * | 9/2010 | Sung et al. | 96/397 |
| 7,840,308 | B2 * | 11/2010 | Matsunaga et al. | 700/254 |
| 2003/0028993 | A1 * | 2/2003 | Song et al. | 15/319 |
| 2006/0059872 | A1 * | 3/2006 | Lee et al. | 55/356 |
| 2006/0137521 | A1 * | 6/2006 | Sung et al. | 95/1 |
| 2006/0278074 | A1 * | 12/2006 | Tseng et al. | 95/57 |
| 2008/0000042 | A1 * | 1/2008 | Jones et al. | 15/319 |
| 2009/0254218 | A1 * | 10/2009 | Sandin et al. | 700/258 |

\* cited by examiner

*Primary Examiner* — Christopher P Jones

(57) ABSTRACT

A movable air purification robot system may automatically eliminate dust, bacteria and smell from air while freely moving along a polluted area irrespective of a space dimension. The movable air purification robot system includes an air purification robot which has an air pollution detector detecting pollution and humidity of floating substances contained in air, an air purifier circulating the air containing pollutants by means of the air pollution detection unit and filtering, absorbing and purifying the same, a robot propulsion unit formed of two driving wheels disposed at both lower sides of a robot body and independently operating, an obstacle detector detecting obstacles a robot user interface allowing a user to operate the robot, a robot control unit controlling the operations of each element, and a power unit supplying electric power to operating elements.

11 Claims, 16 Drawing Sheets

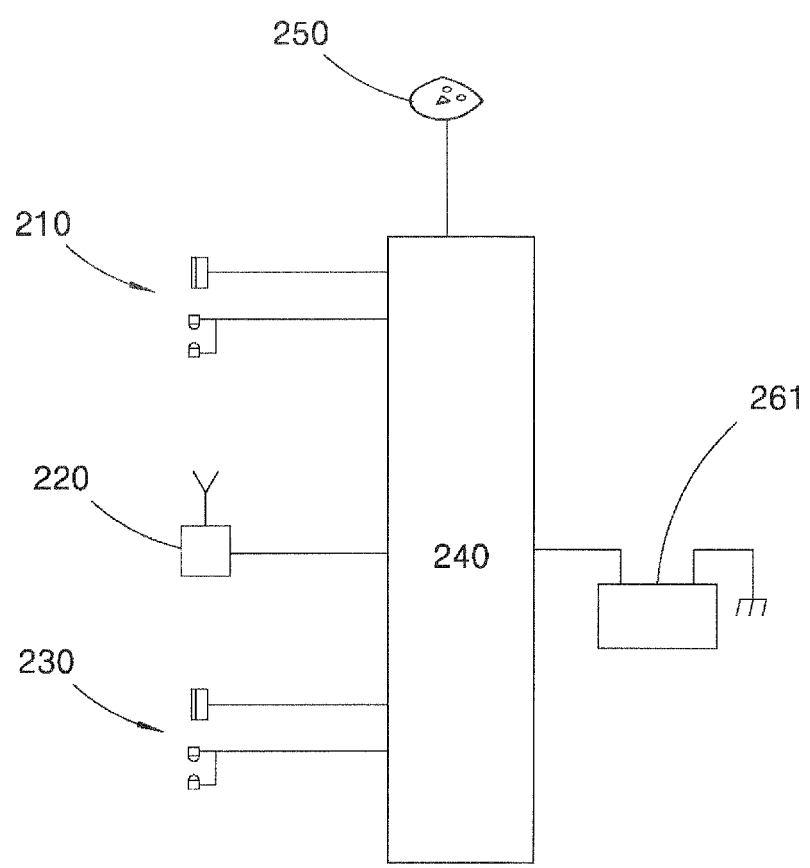

MOVABLE AIR PURIFICATION ROBOT SYSTEM

BACKGROUND OF THE INVENTION

1. Field of the Invention

The present invention relates to a movable air purification robot system, and in particular to a movable air purification robot system which makes it possible to automatically eliminate dust, bacteria and smell from air while freely moving along a polluted area irrespective of a space dimension.

2. Description of the Related Art

Air has a very close relationship with a living environment of a human being. The human being inhales and exhales air at every moment and air always keeps contacting with a human being's skin while affecting the health. In recent years, an air purification system attracts a big attention from many people, by which air is cleaned and purified. The air is not easy to recognize, so it is needed to automatically judge the level of pollution of the particles contained in air.

A conventional air purifier consists of an air suction part for sucking air, a filter part for purifying air and a blowing part for discharging the purified air. The range of air that an air purifier can suck is limited to a space formed around an air purifier.

The conventional air purifier generally used at home and an office is basically designed to purify air only at a fixed position. When the size of an air purifier is small, it is preferably fixed at a rack or a desk, and when the size of an air purifier is large, it is preferably positioned on a wall surface or on a ceiling.

However, the conventional air purifier operating at a fixed position has a problem that only the air residing in a limited space formed around an air purifier can be purified. In addition, an air purifier basically designed to purify only the air in a limited space operates by using an air convention phenomenon. In this case, lots of time and electric power are needed until all indoor air is purified with the help of convention.

In case of a conventional air purifier, it is selected depending on the output or capacity in accordance with an area in which air is to be purified. As an area in which air is to be purified is larger, the price of an air purifier and the capacity of electric power to be consumed disadvantageously increase.

Since a space divided by means of a building or something else, not an open space, is not well air-circulated, air can be purified in only a limited space. In this case, a plurality of air purifiers are disadvantageously needed in multiple places, which might lead to increasing cost.

SUMMARY OF THE INVENTION

Accordingly, it is an object of the present invention to provide a movable air purification robot system which overcomes the problems that an air purification area is limited since a conventional air purifier is installed at a fixed position.

To achieve the above object, there is provided a movable air purification robot system which comprises an air purification robot including an air pollution detection unit for detecting pollution and humidity of floating substance contained in air, an air purification unit for circulating the air containing pollutants by means of the air pollution detection unit and filtering, absorbing and purifying the same, a robot moving unit formed of two driving wheels disposed at both lower sides of a robot body and independently operating, an obstacle detection unit for detecting an obstacle so that the robot moving unit can move freely, a robot operating unit for allowing a user to operate the robot, a robot control unit for controlling the operations of each element, and a power unit for supplying electric power to operating elements.

EFFECTS

Since the movable air purification robot system according to the present invention automatically analyzes components contained in air while freely moving and purifies the air, so it is possible to obtain an excellent air purification effect by using one air purification system with a certain capacity irrespective of an area dimension which is to be air-purified.

Even in a complicated space in which air circulation is bad, it is possible to obtain an excellent air purification effect by using only one air purification system, as compared to a conventional art in which a plurality of air purification systems are needed, unless a plurality of air purification systems are used if a robot running passage or a robot passing space is obtained because a movable robot automatically avoids a certain obstacle.

When a movable robot and an external detection device operate cooperatively, the area in which air is to be analyzed might be extended, and when needed, the movable air purification robot might be called in real time to an area where needs an air purification for thereby efficiently performing an air purification work and maximizing the same.

BRIEF DESCRIPTION OF THE DRAWINGS

A more complete appreciation of the invention and many of the attendant advantages thereof, will be readily apparent as the same becomes better understood by reference to the following detailed description when considered in conjunction with the accompanying drawings in which like reference symbols indicate the same or similar components, wherein:

FIG. 14 is an example view of major elements of a control unit of an external detection device according to the present invention;

DETAILED DESCRIPTION OF THE INVENTION

Figure 1:
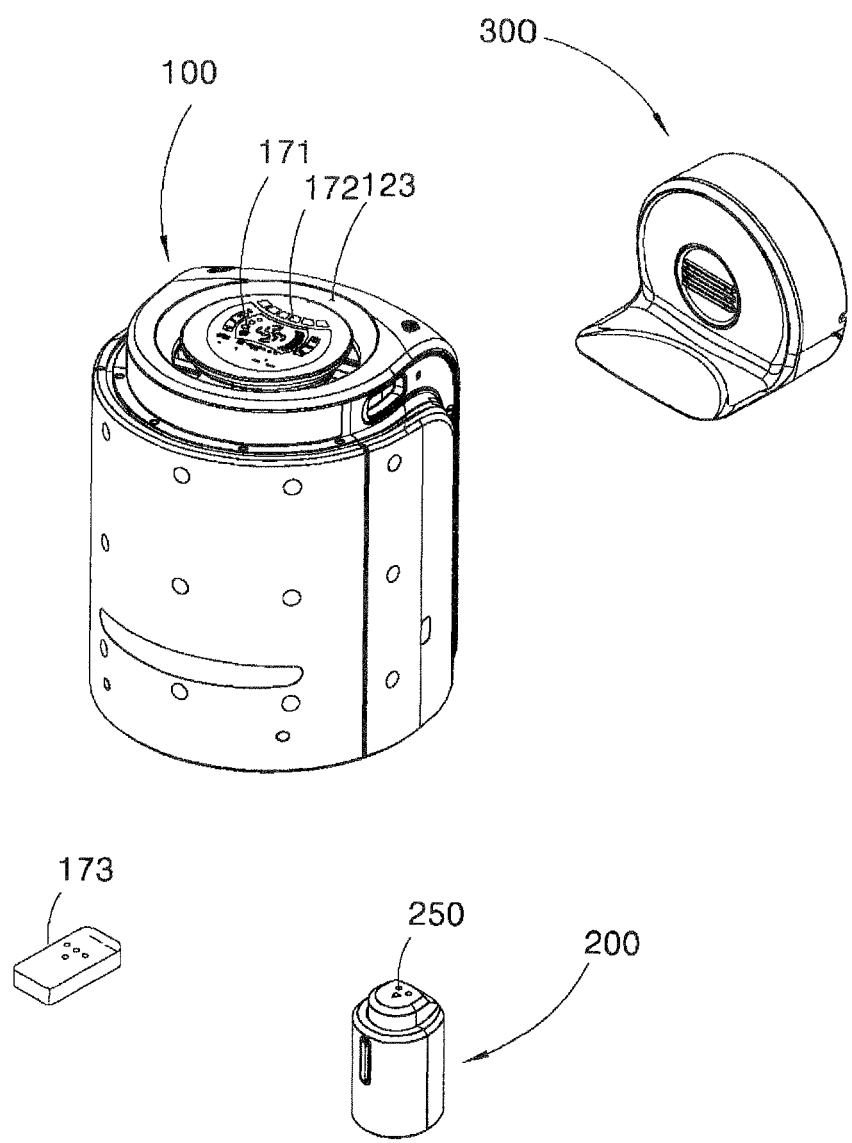
FIG. 1 is a view illustrating the major elements according to an embodiment of the present invention.

The preferred embodiments of the present invention will be described with reference to the accompanying drawings.

The present invention is basically directed to a movable air purification robot which can reliably purify air while automatically moving a wider area.

The movable air purification robot comprises an air pollution detection unit, an air purification unit, a robot moving unit, an obstacle detection unit, a robot operation unit, a robot control unit and a power unit.

The present invention might further include a charging unit 300 for communicating with the air purification robot through a certain communication unit for thereby charging the air purification robot.

The present invention might further include at least one external detection device 200 for calling the air purification robot 100 to an area where needs an air purification, which device 200 is installed in an air purification place for setting an air purification region by means of the air purification robot 100 which has moved to the region in which air is to be purified.

Here the air pollution detection unit consists of an air pollution detection sensor 131 for detecting a dust and harmful gas (VOC: Volatile Organic Components) concentration in air, and a humidity detection sensor 132 for detecting the humidity of air.

The air pollution detection sensor 131 is formed of a dust detection sensor for detecting dusts in the air which has been sucked and a harmful gas sensor for detecting the concentration of VOC in the air which has been sucked. The dust detection sensor might be implemented based on a method for counting the number of dust particles and an optical measurement method for detecting the pollution level of floating particles such as dusts contained in air depending on the intensity of light which has been received after light is emitted from a LED (Light Emitting Diode).

The floating particles include relatively large size home dusts related with allergy, blanket dusts, sand dusts or smoke particles, pollen or yellow dusts.

Figure 2:
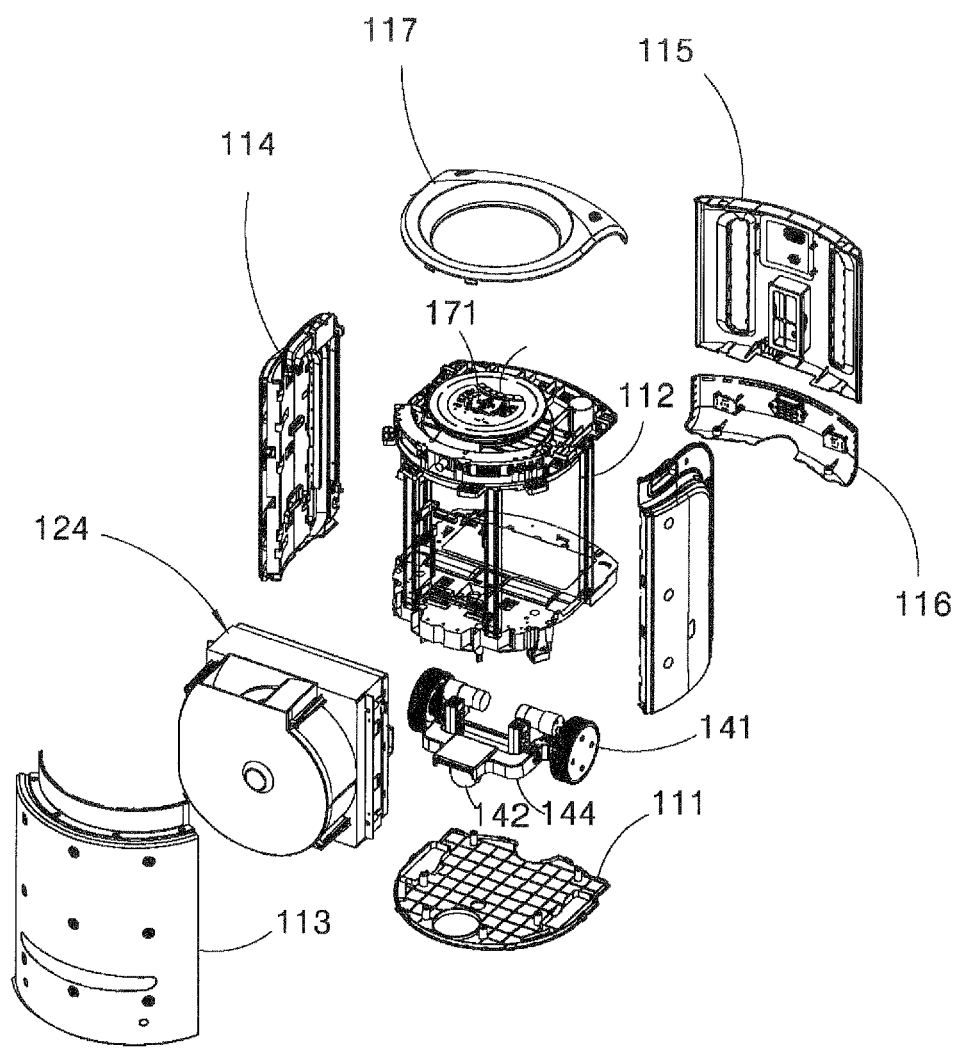
FIG. 2 is a disassembled example view of an air purification robot according to an embodiment of the present invention.
Figure 3:
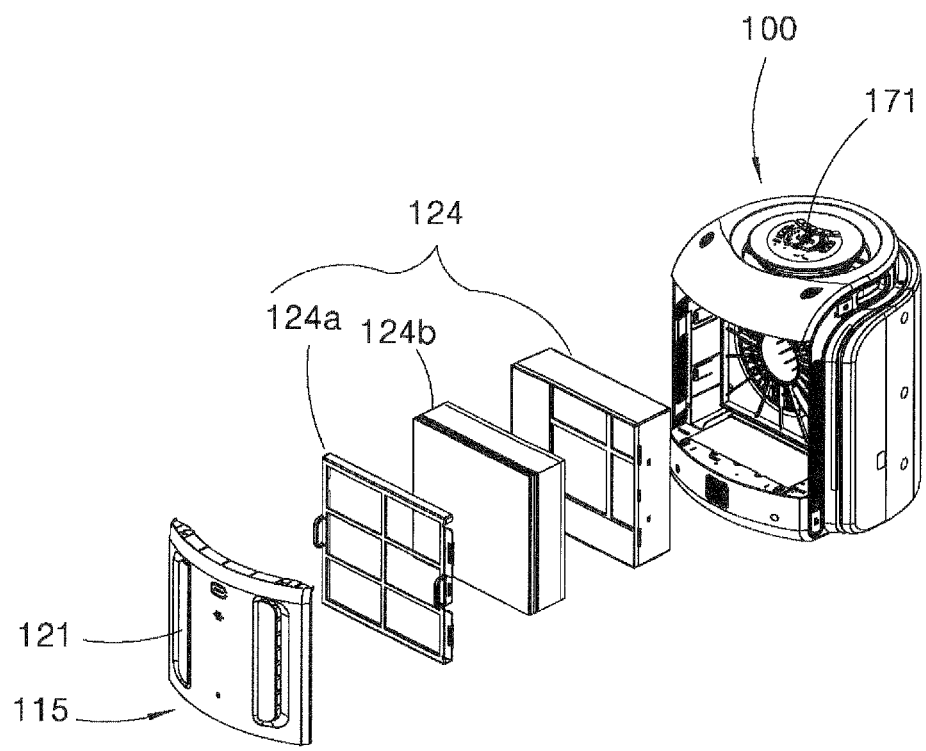
FIG. 3 is a disassembled example view of an air purification unit according to an embodiment of the present invention.
Figure 4:
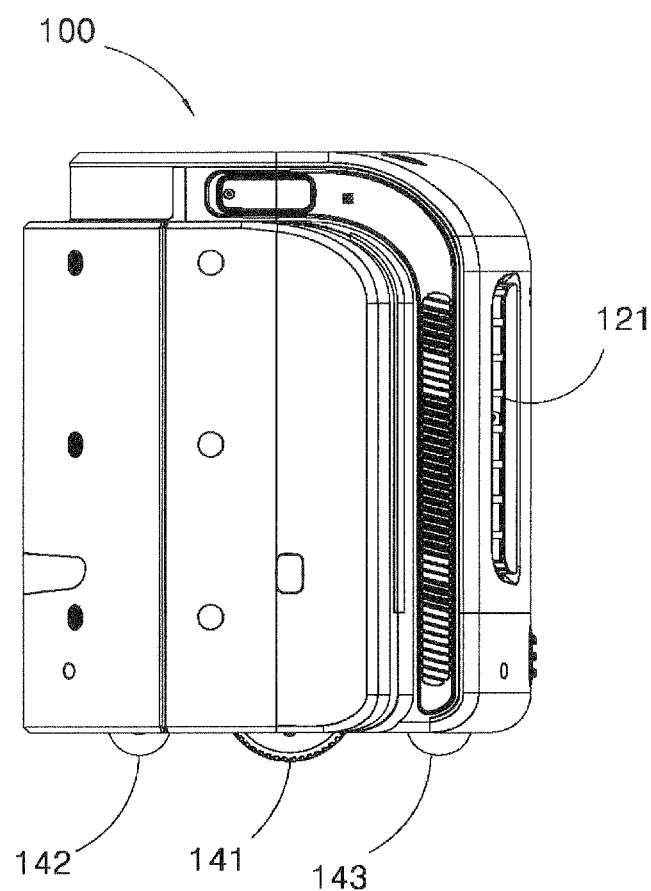
FIG. 4 is a side view of an embodiment of the present invention.
Figure 7:
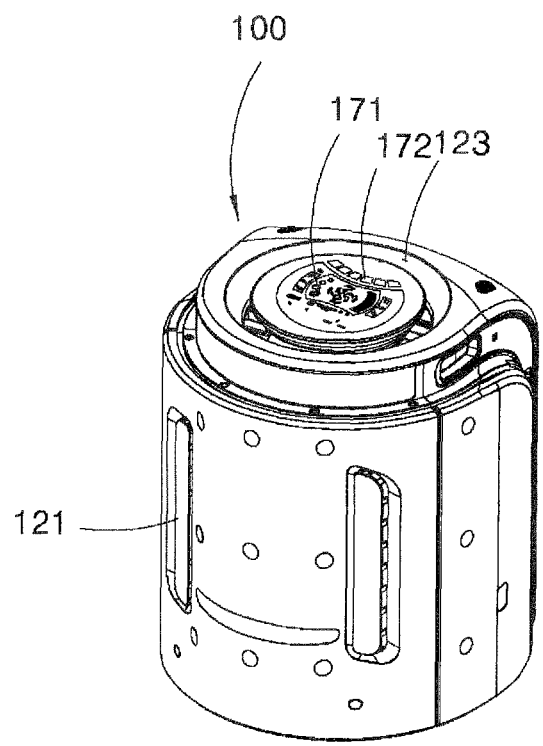
FIG. 7 is an example view illustrating a state that an air suction unit is disposed in a front side as another embodiment of an air purification robot according to the present invention.

As shown in FIGS. 2 and 3, the air purification unit is preferably installed at a center portion of a robot body and forms a purification pipe passage 122 for sucking air from a lateral side and discharging the same upward and consists of a purification filter unit 124 engaged to an air inlet part 121 formed in the purification pipe passage 122, and a circulation fan 125 for circulating air through the purification pipe passage 122. As shown in FIGS. 1, 3 and 4, the air inlet part 121 might be formed either in a backside of a robot body which corresponds to the direction opposite to a running direction of the robot body or as shown in FIG. 7 in a front side of a robot body which corresponds to the running direction of the robot body.

As shown in FIG. 3, the purification filter unit 124 consists of a filtering filter 124a for filtering the dusts from air, and an absorption filter 124b for absorbing harmful gas from air.

It is preferred that the air pollution detection sensor 131 of the air pollution detection unit is disposed in the air inlet part 121 of the air purification unit. When the air inlet part 121 is disposed in a backside of the robot body, it is preferred that the air pollution detection sensor 131 is provided in a front side of the robot body.

The air pollution detection sensor 131 might be installed at both sides of a robot body so that the air purification robot can move to a polluted area for an air purification work by recognizing the polluted area with the help of a pollution detection difference between two sensors installed at both sides of the robot body.

Figure 6:
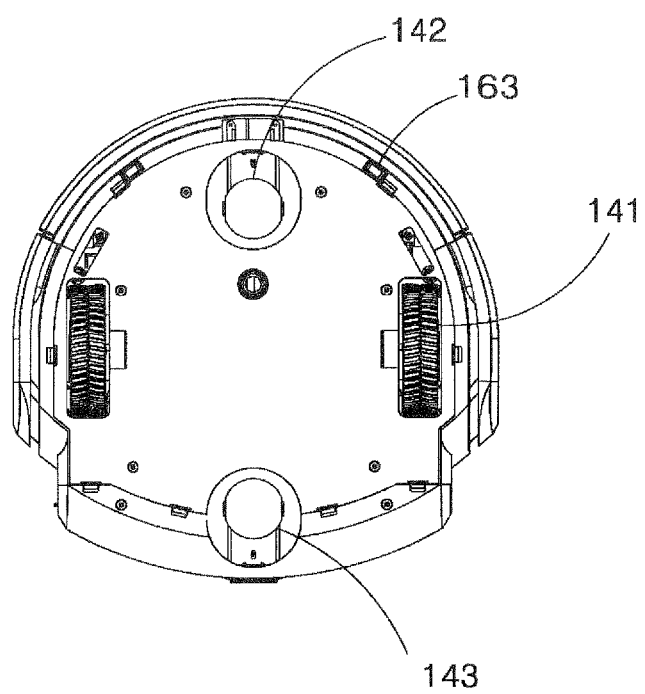
FIG. 6 is a bottom view of an embodiment of the present invention.
Figure 8:
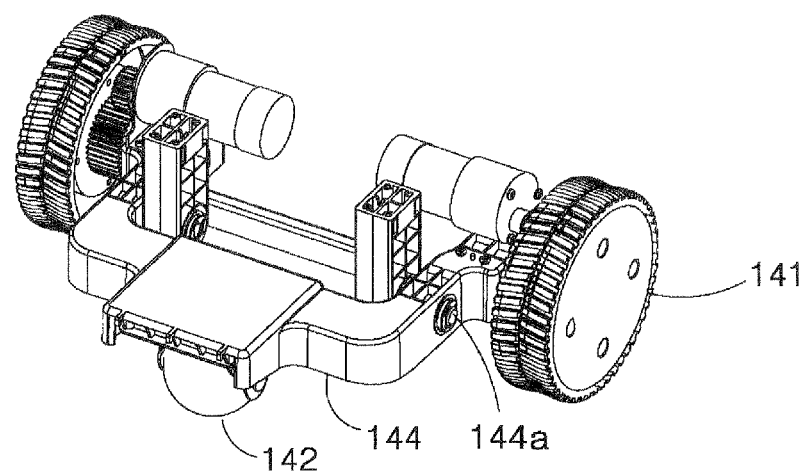
FIG. 8 is an example perspective view of a robot moving unit according to the present invention.

As shown in FIGS. 2, 6 and 8, the robot moving unit consists of a couple of driving wheels 141 which are disposed at both lower sides of a robot body and independently drive from each other, a rear side driven wheel 143 disposed at a rear lower side of the robot body, a front side driven wheel 142 disposed at a front lower side of the robot body, and a seesaw engaging plate 144 of which center portion can rotate about a seesaw shaft 144a at a lower side of the robot body by engaging the front side driven wheel 142 and the two driving wheels 141 so that the driving wheel 141 can seesaw with respect to a lifting-up motion of the front side driven wheel 142 for thereby preventing the driving wheel 141 from being escaped from the ground when the front side driven wheel 142 roll-contacts with a protruded obstacle.

The seesaw shaft 144a which is a seesaw axis of the seesaw engaging plate 144 might be installed at a portion deviated toward the driving wheel 141 so that the robot body can smoothly avoid the protruded obstacle without falling down by means of an up and down displacement of the front side driven wheel 142 by preventing an over up and down displacement of the driving wheel 141 with respect to an up and down displacement of the front side driven wheel. It is preferred that the ratio between the distance from the front side driven wheel 142 to the seesaw shaft 144a and the distance from the seesaw shaft 144a to the driving wheel 141 is 2~3:1.

Figure 10:
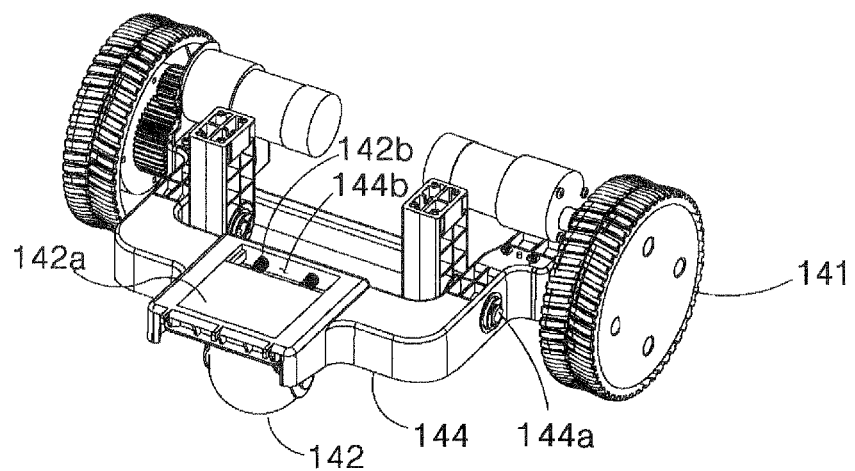
FIG. 10 is an example perspective view of a protruded obstacle collision cushioning structure in a front driven wheel as another embodiment of a robot moving unit according to the present invention.

As shown in FIG. 10, a protruded obstacle collision cushioning structure might be provided for cushioning a collision impact when the front side driven wheel 142 collides with a protruded obstacle. Here the protruded obstacle collision cushioning structure consists of a driven wheel cushioning plate 142a for limiting the front side driven wheel 142, a cushioning plate driving part 144b which forms a driving space so that the driven wheel cushioning plate 142a can be backwardly cushioned in the seesaw plate 144 for thereby allowing the driven wheel cushioning plate 142a to slide, and a damper 142b for elastically supporting the driven wheel cushioning plate 142a in the cushioning plate driving part 144b.

Figure 12:
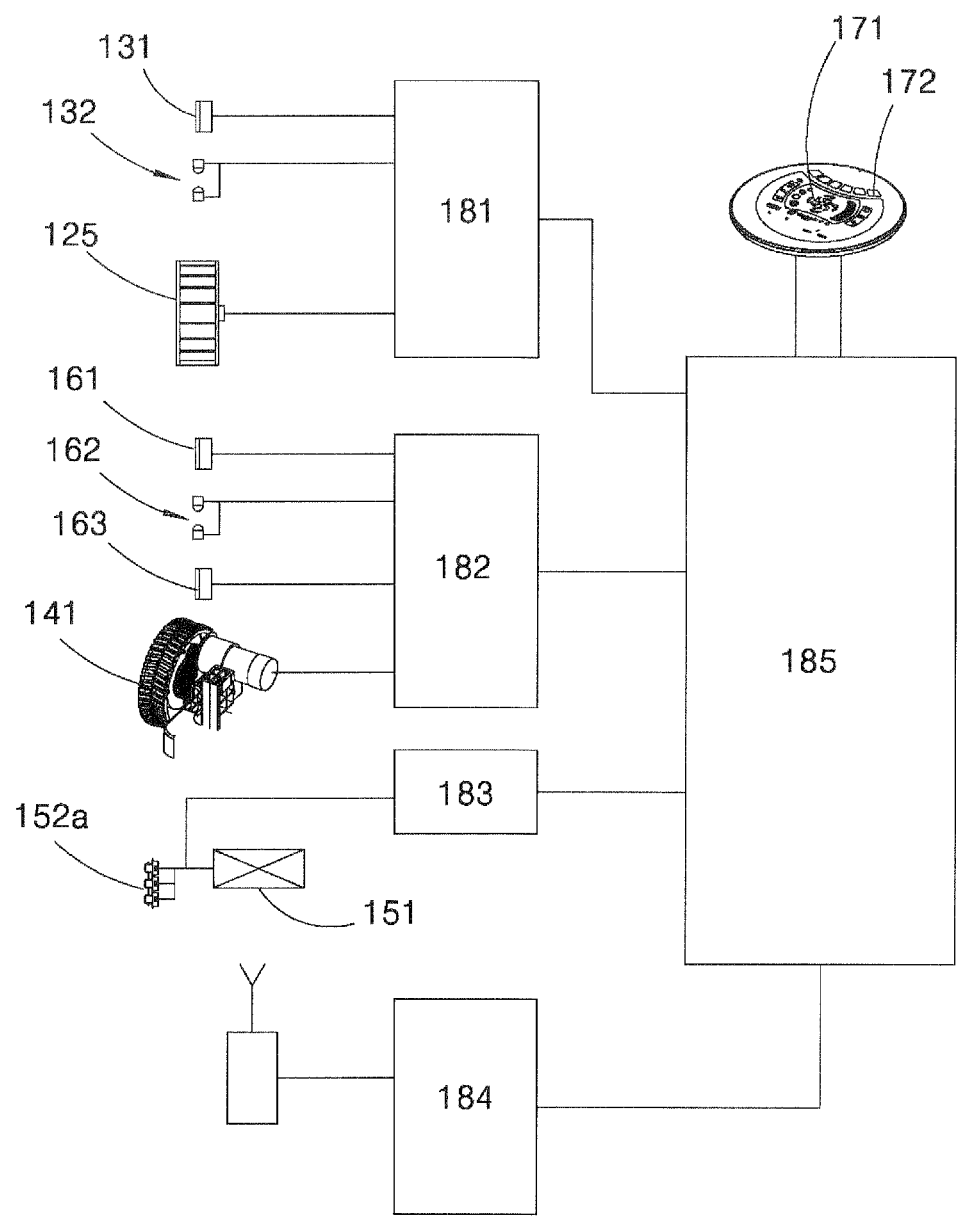
FIG. 12 is an example view of major elements of a control unit of an air purification robot according to the present invention.

As shown in FIGS. 1, 4 and 12, the obstacle detection unit consists of a robot local area sensor 161 disposed at a front side of a robot body for detecting a certain obstacle so that the air purification robot 100 can move in a relatively narrow space by detecting a local area obstacle, a robot remote area sensor 162 disposed at a front side of the robot body by which the air purification robot 100 can avoid the obstacle by detecting a remote area obstacle, and a robot driving wheel sensor 163 for preventing the driving wheel 141 from getting stuck or the robot body from fall down by detecting a groove or a cliff in front of the driving wheels 141 disposed at both lower sides of the robot body.

The robot local area sensor 161 is preferably formed of an infrared ray sensor disposed at a front side and a lateral lower side of the robot body for thereby efficiently detecting a local area.

The robot remote area sensor 162 is formed of an ultrasonic wave sensor in which an ultrasonic wave transmitter is disposed at a front center portion and a lateral side center portion, respectively, and an ultrasonic wave receiver is disposed at a peripheral portion of the ultrasonic wave transmitter for thereby enhancing a detection efficiency of an obstacle.

The robot driving wheel sensor 163 is formed of an infrared ray sensor and is preferably disposed at a position moved by a ¹⁄₁₀~¹⁄₈ rotation that the driving wheel can move in the course of control procedure.

As shown in FIGS. 1 and 2, the robot operation unit includes a display unit 171 disposed on an upper side of the robot body for displaying air pollution, temperature and humidity, and an operation switch 172 disposed in the display unit 171 for operating the same. A wireless remote controller 173 might be further provided in the air purification robot 100 for transmitting a wireless operation signal.

Figure 5:
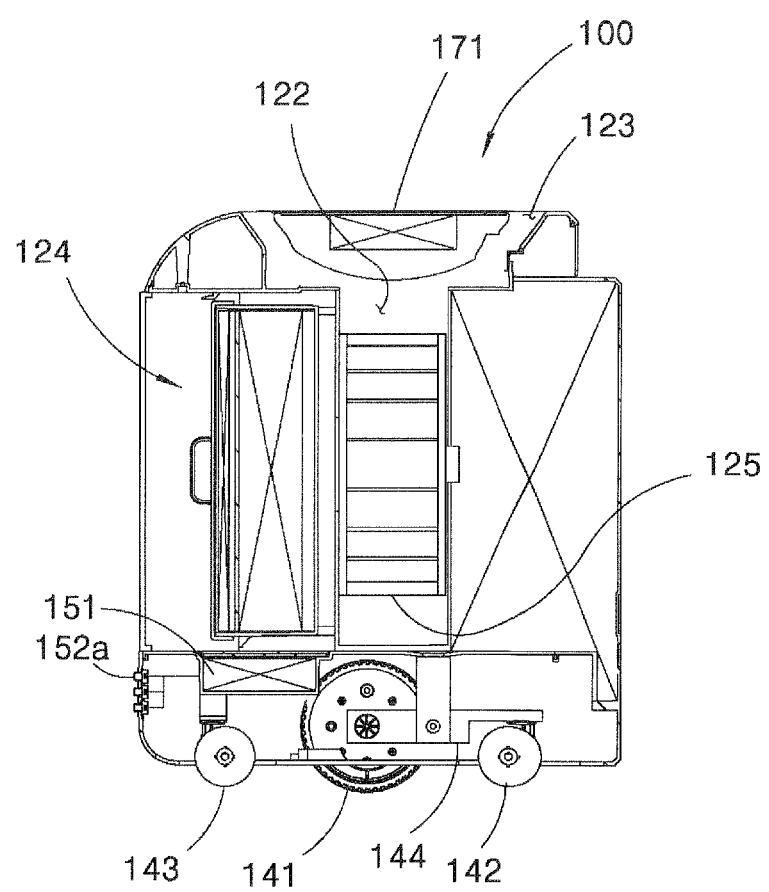
FIG. 5 is a side cross sectional view illustrating an embodiment of the present invention.

As shown in FIGS. 2, 3 and 5, the air purification robot 100 includes a lower body 111 in which a robot moving unit is installed, four body poles 112 installed in an upper side of the lower body 111 for thereby forming a purification pipe passage 122, a front side body 113 engaged to the body pole 112, a couple of side surface bodies 114 engaged to the body pole 112, a backside body 115 which forms an air inlet part 121 for opening and closing the air purification unit, a backside fixing body 116 disposed at a lower side of the backside body 115 and engaged to the lower body 111, a display unit 171 engaged to an upper side of the body pole 112, and an upper body 117 which forms an air outlet part 123 along a rim portion of the display unit 171.

As shown in FIG. 12, the robot control unit includes a pollution detection control unit 181 disposed in an upper body of the robot body for detecting an air pollution inputted into the air pollution detection unit and controlling an operation of the air purification unit, a movement control unit 182 for detecting an obstacle using the obstacle detection unit and controlling an operation of the robot moving unit, a charging control unit 183 for detecting the remaining power of the power unit and controlling the air purification robot to move toward the charging unit 300 for charging itself, a communication control unit 184 for controlling a transmission and receiving signal of the external detection device 200 and the charging unit 300 and a receiving wireless signal inputted into the wireless remote controller 173, and a main control unit 185 for integrally controlling the operation of each control unit and controlling each control unit in accordance with an input signal of the operation switch 172 and a display operation on the display unit 171.

Figure 13A:
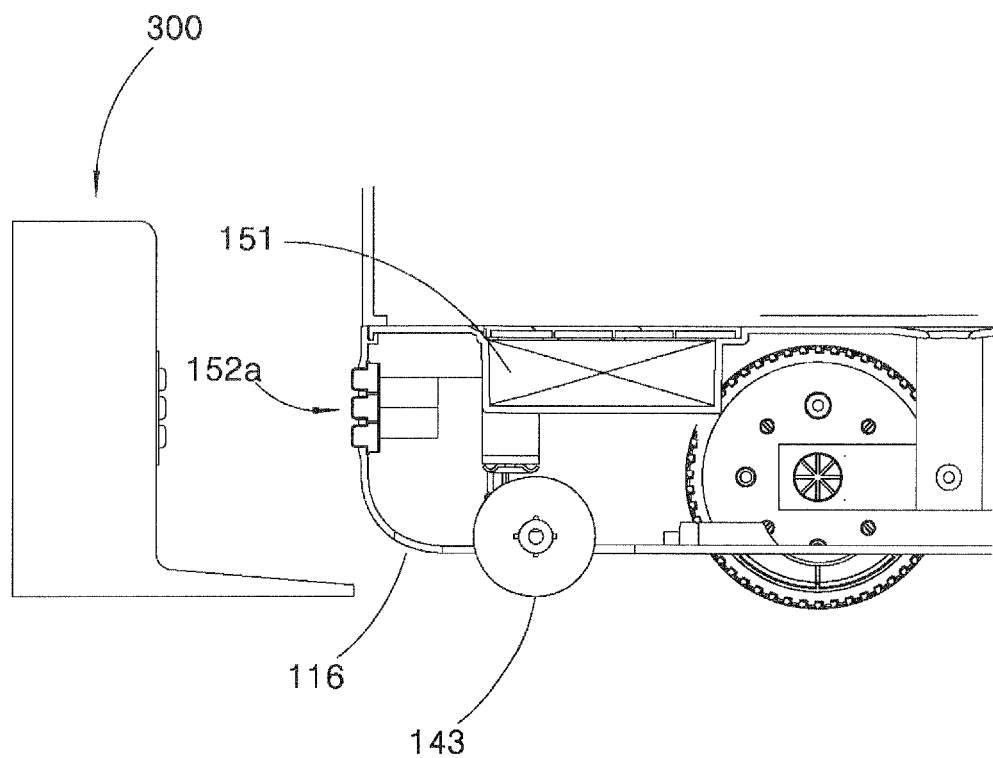
FIG. 13a is an example view of major elements of a power unit.
Figure 13B:
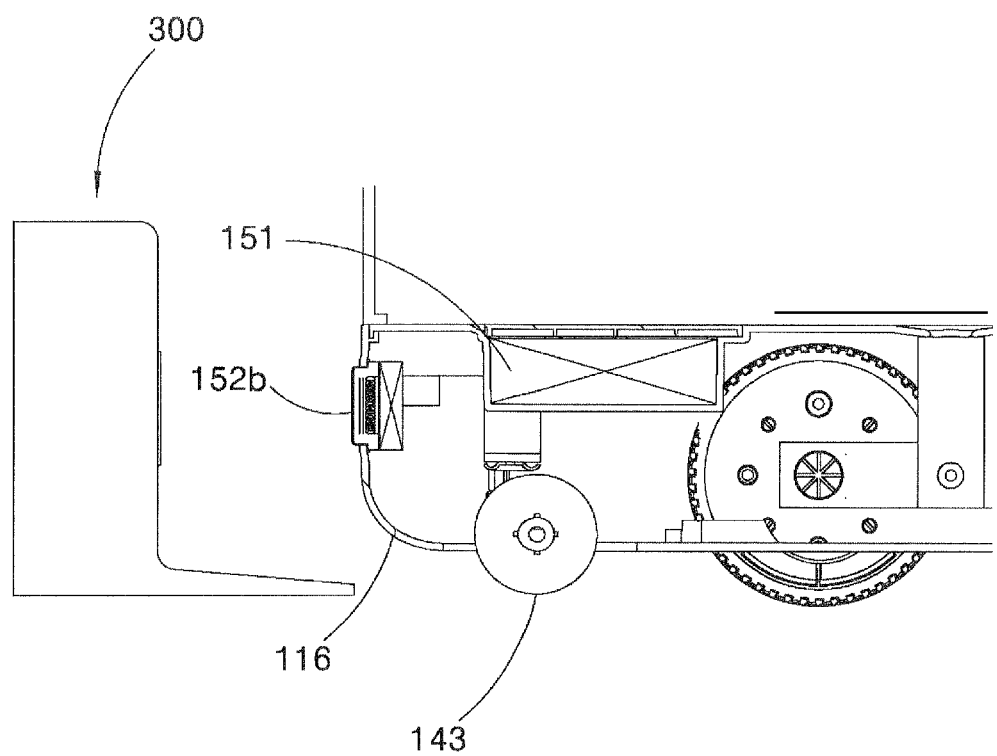
FIG. 13b is another example view of major elements of a power unit.

As shown in FIGS. 13a and 13b, the power unit includes a secondary battery 151 accommodated in a lower side of the robot body, and a power supply unit disposed in the backside fixing body 116 for receiving electric power from the charging unit 300.

As shown in FIG. 13a, the power supply unit might include either a connection terminal 152a directly connected with the charging unit 300 or as shown in FIG. 13b an induction coil connection part 152b for receiving electric power from the charging unit based on magnetic induction.

As shown in FIGS. 1 and 14, the external detection device 200 detects an air pollution in an air purification region set by a user and calls the air purification robot 100 when air is polluted for thereby performing an air purification work or prevents the air purification robot from approaching by setting an approach prohibition region of the air purification robot 100. The external detection device 200 includes an external device pollution detection unit 210 for detecting air pollution, an external device communication unit 220 for communicating with the air purification robot 100, an external device approach detection sensor for detecting an approach of the air purification robot 100, an external device control unit 240 for controlling an operation between the external device pollution detection unit 210 and the external device communication unit 220, an external device operation unit 250 for allowing the external detection device 200 to selectively operate the operation between a purification region monitoring function and an air purification robot approach prohibition function, and an external device power unit for supplying electric power for the operations of the above elements.

Figure 15:
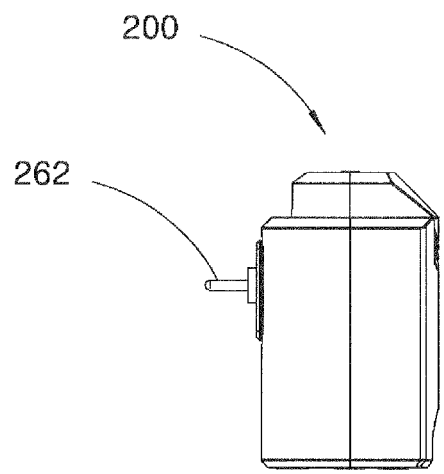
FIG. 15 is an example view of another embodiment of an external detection device according to the present invention.

The external device power unit might include a battery 261 in the interior of the external monitoring device 200 or as shown in FIG. 15 a power plug 262 which is to be inserted into a power outlet disposed on the wall.

Figure 16:
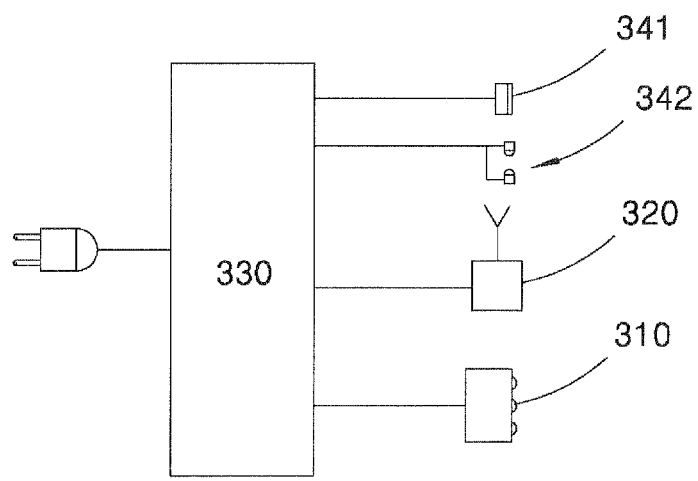
FIG. 16 is an example view of major elements of a control unit of a charging unit according to the present invention.

As shown in FIG. 16, the charging unit 300 includes a charging power unit connected with a power outlet for thereby supplying charging power to the air purification robot, a charging communication unit 320 for guiding the air purification robot through a communication with the air purification robot, a charging approach detection unit for detecting the approach of the air purification robot, and a charging unit control unit 310 for controlling the operations of the charging power unit 330 and the air purification robot, respectively.

The charging approach detection unit includes a charging local area sensor 341 and a charging remote area sensor 342.

The charging unit control unit 310 checks a charging connection state when the air purification robot is connected for charging through a communication with the air purification robot charging control unit 183 and controls a power supply to the air purification robot 100.

Figure 17:
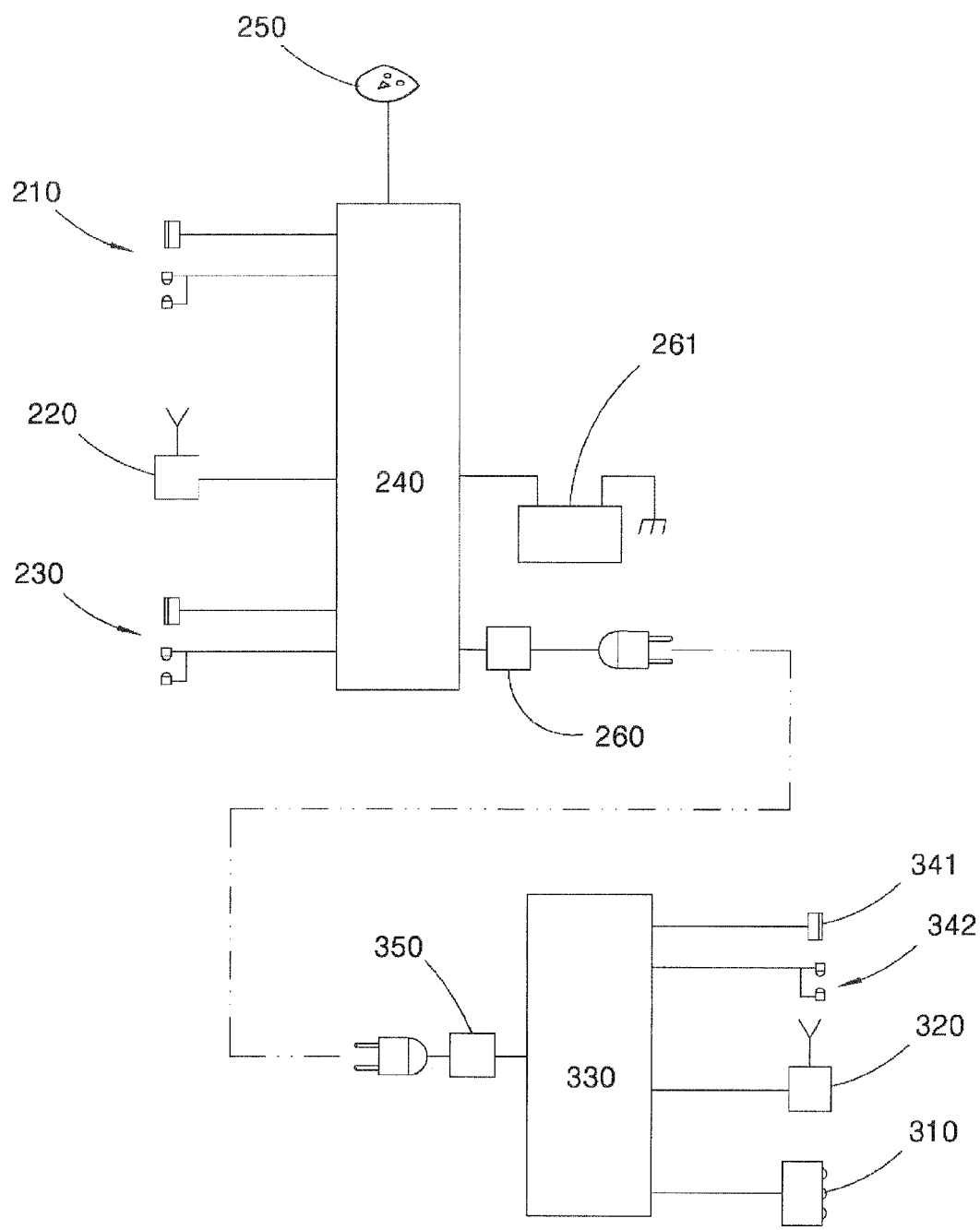
FIG. 17 is a view illustrating major elements of an external detection device and a control unit equipped with a power communication unit in a charging unit according to another embodiment of the present invention.

As shown in FIG. 17, the external detection device 200 includes an external device power communication unit 260 for communicating with the external detection device 200, the charging unit 300 and the power outlet through a power cable, and the charging unit 300 includes a charging power communication unit 350.

In the present invention, the communication between the movable air purification robot, the external detection device 200 and the charging unit 300 can be performed based on a wireless communication method by using a RF (Radio Frequency) signal or an IrDA (Infrared Data Association).

The wireless communication method using radio frequency includes a Bluetooth™, Zigbee™, UWB (Ultra Wideband), CDMA (Binary Code Division Multiple Access), etc.

In the air purification robot according to the present invention which includes the air pollution detection unit, the air purification unit, the robot moving unit, the obstacle detection unit, the robot operation unit, the robot control unit and the power unit, an air purification procedure will be described.

When an air pollution is detected by means of the air pollution detection unit disposed in the air purification robot, the robot control unit operates the blowing fan 125 of the air purification unit for blowing surrounding air into the purification pipe passage 122.

The pollutants contained in the inputted air is filtered and absorbed by means of the purification filter unit 124 for thereby performing an air purification operation.

The moving operation of the air purification robot depending on a call from the external detection device 200 will be described.

In the air pollution monitoring mode, the external detection device calls the air purification robot 100 as the external device control unit 240 controls an external device communication unit when the external device pollution detection unit 210 detects the pollution of air.

The air purification robot 100, which has received a call of the external detection device 200, moves toward a calling region of the external detection device 200 while avoiding a certain obstacle or a certain falling-down portion such as a cliff or something else with the help of the robot remote area sensor 162, the robot local area sensor 161 and the driving wheel sensor 163.

The air purification robot 100, which has moved to the calling region of the external detection device 200, performs an air purification work around the external detection device 200.

In a state that the air purification robot 100 is set as an approach prohibition function by means of a call of the external detection device 200, when the air purification robot 100 approaches, the external device control unit 240 detects an approach of the air purification robot 100 with the help of the external device approach detection sensor 230 and transmits an approach prohibition signal to the air purification robot 100 by controlling the external device communication unit 220.

The air purification robot 100, which has received an approach prohibition signal from the external detection device 200, moves to other place without approaching the external detection device 200 for thereby performing air purification work.

Figure 9:
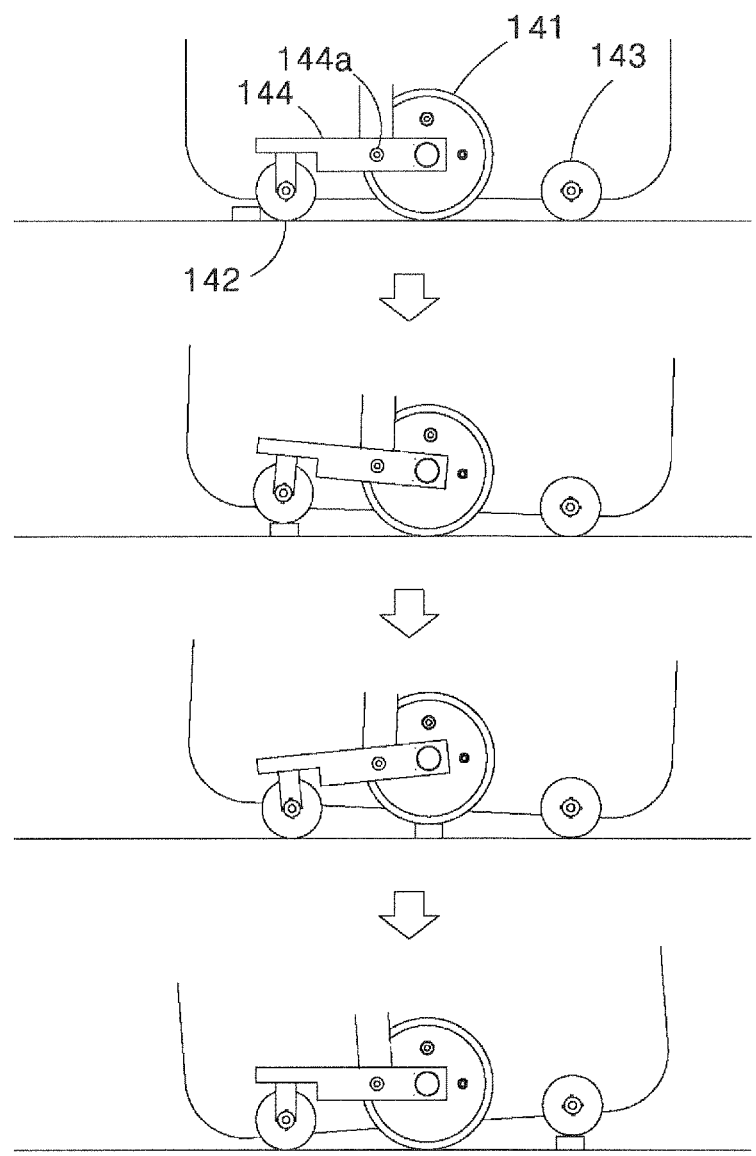
FIG. 9 is an example view illustrating a moving procedure of a protruded obstacle by means of a robot moving unit according to the present invention.

As shown in FIG. 9, the moving procedure of the air purification robot according to the present invention will be described when it meets a protruded obstacle in the course of moving.

When the air purification robot, which is moving with the help of the robot moving unit formed of the front side driven wheel 142 and two driving wheels connected by means of the seesaw engaging plate 144, meets a protruded obstacle of the floor, the front side driven wheel 142 engaged to a front side of the seesaw engaging plate 144 contacts with the protruded obstacle. At this time, the front side driven wheel 142 contacting with the protruded obstacle climbs the protruded obstacle and receives an upward moving force. The upward moving force is transferred to the driving wheel 141 through the seesaw engaging plate 144 which rotates about the seesaw shaft 144a, so the driving wheel 141 move downward, and the front side driven wheel 142 maintains a ground-contacting force with respect to an upper displacement of the robot body which climbs the protruded obstacle for thereby obtaining a stable ground driving state.

When the front side driven wheel 142 passes through the protruded obstacle, and the driving wheel 141 contacts with the protruded obstacle, the driving wheel 141 receives an upward moving force while passing through the protruded obstacle, and the upward moving force allows the front side driven wheel 142 to move downward through the seesaw engaging plate 14 which rotates the seesaw shaft 144a and to contact with the ground, so that it is possible to prevent the driving wheel 141 from falling down when it climbs over the protruded obstacle.

When the rear side driven wheel 143 climbs over the protruded obstacle, the front side driven wheel 142 and the driving wheel 141 maintain ground-contact states by means of the rotation of the seesaw engaging plate 144 about the seesaw shaft 144a, so that it can stably climb over the protruded obstacle without falling down.

Figure 11:
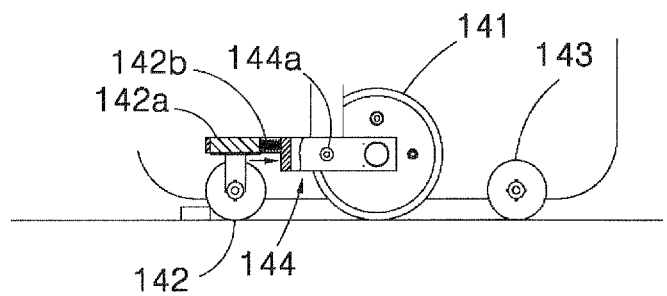
FIG. 11 is a side example view of an operation procedure of FIG. 10.

As shown in FIG. 10, a protruded obstacle collision cushioning structure might be installed in the front side driven wheel 142. As shown in FIG. 11, the front side driven wheel 142 is cushioned backward with respect to the impact occurring when the protruded obstacle contacts with the front side driven wheel 142 for thereby reliably cushioning the impact due to the collision with the protruded obstacle.

The charging procedure by means of the charging unit 300 will be described.

The charging control unit 183 of the robot control unit detects the remaining power of the electric power unit and judges the consumption power based on the distance from the charging unit 300 and its movement. As a result of the judgment, when a charging is needed, a communication is made through the charging control unit 183 and the communication control unit 184.

After receiving a position signal of the charging unit 300 from the charging communication unit 320 of the charging unit 300, the air purification robot 100 moves to the charging unit 300. When the air purification robot 100 gets close to the charging unit 300, it approaches based on the detections of the charging local area sensor 341 and the charging remote area sensor 342 for thereby performing a charging operation.

As the present invention may be embodied in several forms without departing from the spirit or essential characteristics thereof, it should also be understood that the above-described examples are not limited by any of the details of the foregoing description, unless otherwise specified, but rather should be construed broadly within its spirit and scope as defined in the appended claims, and therefore all changes and modifications that fall within the meets and bounds of the claims, or equivalences of such meets and bounds are therefore intended to be embraced by the appended claims.

What is claimed is:

1. A movable air purification robot system, comprising:
   an air purification robot, said air purification robot including:
      an air pollution detector detecting pollution and humidity of floating substances contained in ambient air;
      an air purifier circulating the ambient air containing pollutants by means of the air pollution detector and filtering, absorbing, and purifying the same;
      a robot propulsion unit formed of two driving wheels disposed at different lower sides of a robot body to operate independently of each other;
      an obstacle detector detecting obstacles to guide the movement of the robot propulsion unit;
      a user interface allowing a user to operate said air purification robot; and
      a robot control unit controlling operations of the air pollution detector, the air purifier, the robot propulsion unit, the obstacle detector, and the user interface; and
   a charging unit which communicates with the air purification robot charging the air purification robot; and
   at least one external detection device which calls the air purification robot to an air purification request region and is installed in the air purification region setting the air purification region by means of the air purification robot which has moved to the air purification request region.

2. The system of claim 1, said charging unit
   a charging power unit connected with a first power outlet supplying charging power to the air purification robot;

a charging communication unit guiding the air purification robot through a communication with the air purification robot;

a charging approach detector detecting an approach of the air purification robot and a charging control unit controlling operations of the charging power unit and the air purification robot, respectively, and said external detection device including:

an external device pollution detector detecting air pollution;

an external device communication unit communicating with the air purification robot;

an external device approach detector detecting an approach of the air purification robot;

an external device control unit controlling an operation between the external device pollution detector and the external device communication unit;

an external device operation unit allowing the external detection device to selectively perform a purification region monitoring function and an air purification robot approach prohibition function; and an external device power unit supplying electric power for operations of the external device pollution detector, the external device communication unit, the external device approach detector, the external device control unit, and the external device operation unit.

3. The system of claim 2, said external device power unit formed of either a battery disposed in the interior of the same or a power plug connected to a second power outlet disposed on a wall.

4. The system of claim 2, said external device power unit including a power plug which can be connected to a second power outlet, said external detection device including an external device power communication unit communicating, with an electric cable connected through the second power outlet, and said charging unit including a charging electric power communication unit.

5. A movable air purification robot system, comprising:

an air purification robot, said air purification robot including:

an air pollution detector detecting pollution and humidity of floating substances contained in ambient air;

an air purifier circulating the ambient air containing pollutants by means of the air pollution detector and filtering, absorbing, and purifying the same a robot propulsion unit formed of two driving wheels disposed at different lower sides of a robot body to operate independently of each other;

an obstacle detector detecting obstacles to guide the movement of the robot propulsion unit;

a user interface allowing a user to operate said air purification robot; and a robot control unit controlling operations of the air purification robot, the air pollution detector, the air purifier, the robot propulsion unit, the obstacle detector, and the user interface, and said robot propulsion unit further including:

a rear side driven wheel disposed at a rear lower side of the robot body;

a front side driven wheel disposed at a front lower side of the robot body; and a seesaw engaging plate of which a center portion can rotate about a seesaw shaft at a lower side of the robot body by engaging the front side driven wheel and the two driving wheels so that the driving wheels can seesaw with respect to a lifting-up motion of the front side driving wheels wheel for thereby preventing the driving wheels from separating from a ground when the front side driven wheel roll-contacts with a protruded obstacle.

6. The system of claim 5, wherein said seesaw shaft, which is a seesaw axis of the seesaw engaging plate, is installed at a portion deviated toward the driving wheels for thereby preventing the robot body from falling down by means of an up and down displacement of the front driven wheel by preventing an over up and down displacement of the driving wheels with respect to the up and down displacement of the front side driven wheel, and the ratio between the distance from the front side driven wheel to the seesaw shaft and the distance from the seesaw shaft to one of the driving wheels is 2~3:1.

7. The system of claim 6, wherein a protruded obstacle collision cushioning structure is installed cushioning a collision impact when the front side driven wheel collides with a protruded obstacle, and said protruded obstacle collision cushioning structure consists of a driven wheel cushioning plate limiting the front side driven wheel, a cushioning plate driving part which forms a driving space so that the driven wheel cushioning plate can be backwardly cushioned in the seesaw plate for thereby allowing the driven wheel cushioning plate to slide, and a damper elastically supporting the driven wheel cushioning plate in the cushioning plate driving part.

8. A movable air purification robot system, comprising:

an air purification robot including:

an air pollution detector detecting pollution and humidity of floating substances contained in ambient air;

an air purifier circulating the ambient air containing pollutants and filtering, absorbing, and purifying the same;

a robot propulsion unit formed of two driving wheels disposed at different lower sides of a robot body to operate independently of each other;

an obstacle detector detecting obstacles to guide the movement of the robot propulsion unit;

a user interface allowing a user to operate said air purification robot;

a robot control unit controlling operations of the air pollution detector, the air purifier, the robot propulsion unit, the obstacle detector, and the user interface; and a power unit supplying electric power to the air pollution detector, the air purifier, the robot propulsion unit, the obstacle detector, the user interface, and the robot control unit, said air pollution detector including:

an air pollution level sensor detecting a concentration of dusts and harmful gases (VOC: Volatile Organic Components) in the ambient air; and a humidity sensor detecting humidity of the ambient air, and said air purifier installed at a center portion of the robot body and forming a purification pipe passage to suck the ambient air from a lateral side and to discharge the same upward, and said air purifier further including:

a purification filter engaged to an air inlet formed in the purification pipe passage; and a circulation fan circulating air through the purification pipe passage, and said air inlet formed either in a backside of the robot body which corresponds to the direction opposite to a running direction of the robot body or in a front side of the robot body which corresponds to a running direction of the robot body, and said user interface including:
a display unit disposed on an upper side of the robot body displaying air pollution, temperature, and humidity;
an operation switch disposed in the display unit operating the same; and
a wireless remote controller disposed in the air purification robot transmitting a wireless operation signal, and said power unit including a secondary battery accommodated in the lower side of the robot body and a power supply unit disposed in a backside fixing body receiving electric power from a charging unit, said power supply unit including either a connection terminal directly connected with the charging unit or an induction coil connector receiving electric power from the charging unit based on magnetic induction, and said robot control unit including a communication control unit that transmits signals to an external detection device which detects air pollution and to the charging unit and operationally responds to receipt of signals from the external detection device, the charging unit, and the wireless remote controller.

9. The system of claim 8, said robot control unit further including:
a pollution detection control unit disposed in an upper body of the robot body detecting air pollution by using the air pollution detector and controlling an operation of the air purifier;
a movement control unit detecting obstacles by using the obstacle detector and controlling an operation of the robot propulsion unit;
a charging control unit detecting the remaining power of the power unit and controlling the air purification robot to move toward the charging unit to self-charge the air purification robot; and
a main control unit controlling the operation of each control unit and controlling each control unit in accordance with an input signal of the operation switch and a display operation on the display unit.

10. The system of claim 8, said robot body of the air purification robot including:
a lower body in which the robot propulsion unit is installed;
four body poles installed in an upper side of the lower body forming the purification pipe passage;
a front side body engaged to one of the body pole;
a couple of side surface bodies engaged to one of the body poles;
a backside body which forms an air inlet opening and closing the air purification unit;
the backside fixing body disposed at a lower side of the backside body and engaged to the lower body;
the display unit engaged to an upper side of one of the body poles; and
an upper body which forms an air outlet along a rim portion of the display unit.

11. The system of claim 8, wherein said air pollution detector is installed at a plurality of sides of the robot body so that the air purification robot can move to a polluted area that needs air purification by recognizing the polluted area in accordance with a pollution difference between two sensors installed at the plurality of sides of the robot body.

* * * * *